(12) United States Patent
Karst

(10) Patent No.: US 11,274,746 B1
(45) Date of Patent: Mar. 15, 2022

(54) METHOD AND SYSTEM FOR EVALUATING HYDROSTATIC TRANSMISSION USING CHARGE PRESSURE

(71) Applicant: DEERE & COMPANY, Moline, IL (US)

(72) Inventor: Austin J. Karst, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/176,221

(22) Filed: Feb. 16, 2021

(51) Int. Cl.
  *F16H 61/4192* (2010.01)
  *F16H 39/02* (2006.01)
  *F16H 61/44* (2006.01)
  *F16H 61/00* (2006.01)

(52) U.S. Cl.
  CPC ......... *F16H 61/4192* (2013.01); *F16H 39/02* (2013.01); *F16H 61/0025* (2013.01); *F16H 61/44* (2013.01); *F16H 2061/0068* (2013.01)

(58) Field of Classification Search
  CPC .. F16H 61/4192; F16H 39/02; F16H 61/0025; F16H 2061/0068
  See application file for complete search history.

(56) References Cited

U.S. PATENT DOCUMENTS 6,491,118 B1* 12/2002 Hou ..................... B62D 11/18
                                                  180/6.44

* cited by examiner

*Primary Examiner* — Michael Leslie
*Assistant Examiner* — Daniel S Collins

(57) ABSTRACT

A method of diagnosing a hydrostatic transmission system includes defining an initial charge pressure of a charge pump at a defined operating position of a primary pump. The primary pump is controlled to operate at the defined operating position. A current charge pressure from the charge pump is sensed when the primary pump is operating at the defined operating position. A pressure difference between the initial charge pressure of the charge pump and the current charge pressure of the charge pump is calculated and correlated to a system state of health of the hydrostatic transmission system.

23 Claims, 3 Drawing Sheets

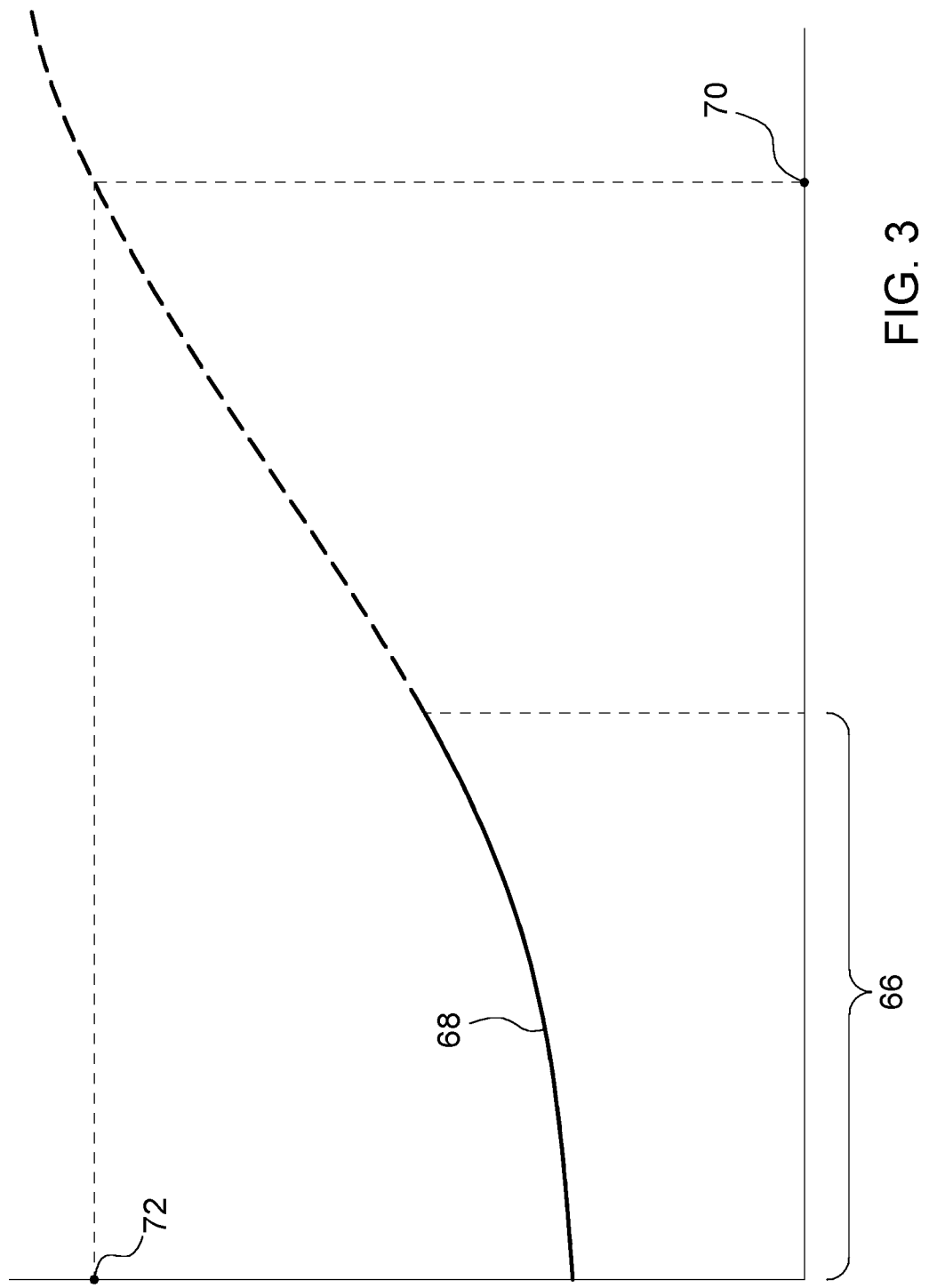

METHOD AND SYSTEM FOR EVALUATING HYDROSTATIC TRANSMISSION USING CHARGE PRESSURE

TECHNICAL FIELD

The disclosure generally relates to a hydrostatic transmission system and a method of evaluating the performance of a hydrostatic transmission system.

BACKGROUND

In some implementations, a hydrostatic transmission may include a primary pump that circulates pressurized fluid through a hydraulic motor and back to the primary pump through a closed hydraulic fluid circuit. The hydraulic motor generates a rotational output in response to the fluid flow from the primary pump. Because the primary pump and the hydraulic motor are fluidically connected by the closed hydraulic fluid circuit, the fluid recirculates between the primary pump and the hydraulic motor. As such, the primary pump does not directly draw the fluid from a reservoir or supply tank.

In some circumstances, the fluid may leak from the closed hydraulic fluid circuit. These leaks may develop from loose connections, worn or cracked hoses, etc. Other fluid losses from the closed hydraulic fluid circuit may derive internally from the hydraulic motor and/or the primary pump. For example, due to normal wear during use, seals within the hydraulic motor may begin to leak, and allow a portion of the fluid to escape the closed fluid hydraulic circuit. Additionally, the primary pump and/or the hydraulic motor may divert a portion of the pressurized fluid for cooling and/or lubrication purposes. Fluid leakage from the hydraulic fluid circuit may be collected and returned to a reservoir for storage. The amount of fluid leakage and/or the fluid leakage rate may increase with usage of the hydraulic motor. In other words, as the seals in the hydraulic motor wear over time with usage, the fluid leakage rate of the hydraulic motor or the primary pump may increase.

In order to replenish the fluid lost from the closed hydraulic fluid circuit, the hydrostatic transmission system may include a charge pressure pump. The charge pressure pump is fluidically connected to the reservoir which holds a supply of the fluid. The charge pressure pump draws the fluid from the reservoir and pressurizes the fluid to a charge pressure. The charge pressure pump is further fluidically connected to the closed hydraulic fluid circuit. The charge pressure pump supplies the fluid at the charge pressure to the closed hydraulic fluid circuit as needed to replenish any fluid lost from the closed hydraulic fluid circuit through leakage.

In order to diagnose functionality of the hydraulic motor, it may be necessary to determine the fluid leakage rate from the hydraulic motor. This often requires opening the closed hydraulic fluid circuit for testing. This procedure is difficult, timely, and may potentially introduce foreign matter into the closed hydraulic fluid circuit.

SUMMARY

A method of evaluating performance of a hydrostatic transmission system is provided. The hydrostatic transmission system includes a primary pump, a hydraulic motor, and a charge pump fluidically connected via a closed hydraulic fluid circuit. The method includes defining an initial charge pressure of the charge pump at a defined operating position of the primary pump. The primary pump may then be controlled with a transmission controller to operate at the defined operating position. A current charge pressure from the charge pump may then be sensed with a charge pressure sensor when the primary pump is operating at the defined operating position. A pressure difference between the initial charge pressure of the charge pump and the current charge pressure of the charge pump may be calculated with the transmission controller. The transmission controller may then correlate the pressure difference to a system state of health of the hydrostatic transmission system.

In one aspect of the disclosure, the system state of health may include an estimated life cycle usage and/or a remaining life expectancy. The life cycle usage and/or remaining life expectancy may be based on a magnitude of the pressure difference. In another implementation, the system state of health may include an identification of a potential failure mode based on the magnitude of the pressure difference.

In one aspect of the disclosure, sensing the current charge pressure and calculating the pressure difference may include sensing the current charge pressure and calculating the pressure difference during a plurality of different operating conditions over a period of usage to provide a plurality of distinct results over the period of usage. The plurality of distinct results may be saved in a memory of the transmission controller. The transmission controller may extrapolate a trend from the plurality of distinct results over the period of usage. The trend may be extended through a future usage period, such that a future state of health at the future usage period may be estimated based on the trend.

In one aspect of the disclosure, the transmission controller may receive a test command via an input device. The test command may be a user request to execute a transmission test mode with the transmission controller. In response to receiving the test command, the transmission controller may execute the transmission test mode to engage a park brake, and subsequent to engaging the park brake, control the primary pump to operate at the defined operating position.

In one aspect of the disclosure, the transmission controller may correlate the pressure difference to the system state of health of the hydrostatic transmission system by estimating a current charge flow leakage rate from the pressure difference. The charge flow leakage rate may be calculated from the pressure difference. As such, the pressure difference is directly related to the charge flow leakage rate, which is an indication of the health of the hydraulic motor and/or the state of health of the hydrostatic transmission system. For this reason, the pressure difference may be used as an indicator of the state of health of the hydrostatic transmission system.

In one aspect of the disclosure, a message requesting maintenance for the hydrostatic transmission system may be automatically communicated when the pressure difference is outside an allowable pressure range.

In one aspect of the disclosure, a health database that includes a respective value for the system state of health for each of a plurality of ranges of variation from the initial charge pressure may be defined and saved in the memory of the transmission controller. In one implementation, the transmission controller may determine which of the plurality of ranges of variation from the initial charge pressure the pressure difference is within to identify the respective value for the system state of health.

A hydrostatic transmission system is also provided. The hydrostatic transmission system includes a primary pump and a hydraulic motor fluidically connected via a closed hydraulic fluid circuit. The primary pump is operable to pressurize and circulate a fluid through the closed hydraulic fluid circuit to the hydraulic motor at an operating pressure, and receive the fluid via the closed hydraulic fluid circuit from the hydraulic motor. A tank is configured to contain a supply of the fluid. A charge pump is fluidically connected to the tank and the closed hydraulic fluid circuit. The charge pump is operable to pressurize the fluid to a charge pressure to replenish the fluid lost through leakage from the closed hydraulic fluid circuit. A charge pressure sensor is positioned to sense the charge pressure of the fluid from the charge pump. A transmission controller includes a processor and a memory having a transmission diagnostic algorithm stored therein. The processor is operable to execute the transmission diagnostic algorithm to receive a test command via an input device requesting initiation of a transmission test mode. In response to the test command, the transmission controller may then control the primary pump to operate at a defined operating position, and sense a current charge pressure from the charge pump when the primary pump is operating at the defined operating position. The current charge pressure may be sensed by the charge pressure sensor, and communicated to the transmission controller. A pressure difference between an initial charge pressure of the charge pump at the defined operating position of the primary pump and the current charge pressure of the charge pump may then be calculated. The pressure difference may then be correlated to a system state of health of the hydrostatic transmission system.

In one aspect of the disclosure, in response to the test command, the transmission controller may execute the transmission diagnostic algorithm to engage a park brake prior to controlling the primary pump to operate at the defined operating position.

In one aspect of the disclosure, the processor is operable to execute the transmission diagnostic algorithm to include an estimated life cycle usage and/or a remaining life expectancy with the system state of health. The estimated life cycle usage and the remaining life expectancy may be based on a magnitude of the pressure difference. In another implementation of the disclosure, the processor is operable to execute the transmission diagnostic algorithm to include identification of a potential failure mode with the system state of health. The potential failure mode may be based on the magnitude of the pressure difference.

In one aspect of the disclosure, the processor is operable to execute the transmission diagnostic algorithm to sense the current charge pressure and calculate the pressure difference during a plurality of different operating conditions over a period of usage to provide a plurality of distinct results over the period of usage. The transmission controller may then save the plurality of distinct results in the memory, and extrapolate a trend from the plurality of distinct results over the period of usage. The transmission controller may extend or project the trend through a future usage period. The transmission controller may then estimate a future system state of health at the future usage period based on the trend.

In one aspect of the disclosure, the processor is operable to execute the transmission diagnostic algorithm to automatically communicate a message requesting maintenance for the hydrostatic transmission system when the pressure difference is outside an allowable pressure range.

Accordingly, the hydrostatic transmission system and the method disclosed herein use the pressure difference, i.e., the change in charge pressure between the initial charge pressure and the current charge pressure to determine the state of health of the hydrostatic transmission system. The initial charge pressure may be defined at the time of manufacture and/or as an optimum or fully operational charge pressure.

Through normal wear, the fluid leakage rate out of the closed hydraulic fluid circuit may increase. Because the pressure difference is directly related to the fluid leakage rate of the hydrostatic transmission system, it may be used as a predictor or estimator of the overall health of the system. The lower the pressure difference and thereby the lower the fluid leakage rate, the higher the state of health of the hydrostatic transmission system. In contrast, the higher the pressure difference and thereby the higher the fluid leakage rate, the lower the state of health of the hydrostatic transmission system. By using the pressure difference to diagnose the performance of the hydrostatic transmission system and/or calculate the fluid leakage rate, maintenance personnel do not have to open the closed hydraulic fluid circuit to perform complex diagnostic tests on the hydraulic motor.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic graph showing a trendline over a period of usage for predicting a future state of health of the hydrostatic transmission system.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a hydrostatic transmission system is generally shown at 20. The hydrostatic transmission system 20 may be used to propel a vehicle, such as but not limited to, a self-propelled windrower, a tractor, a bulldozer, a combine, or some other moveable platform.

Figure 1:
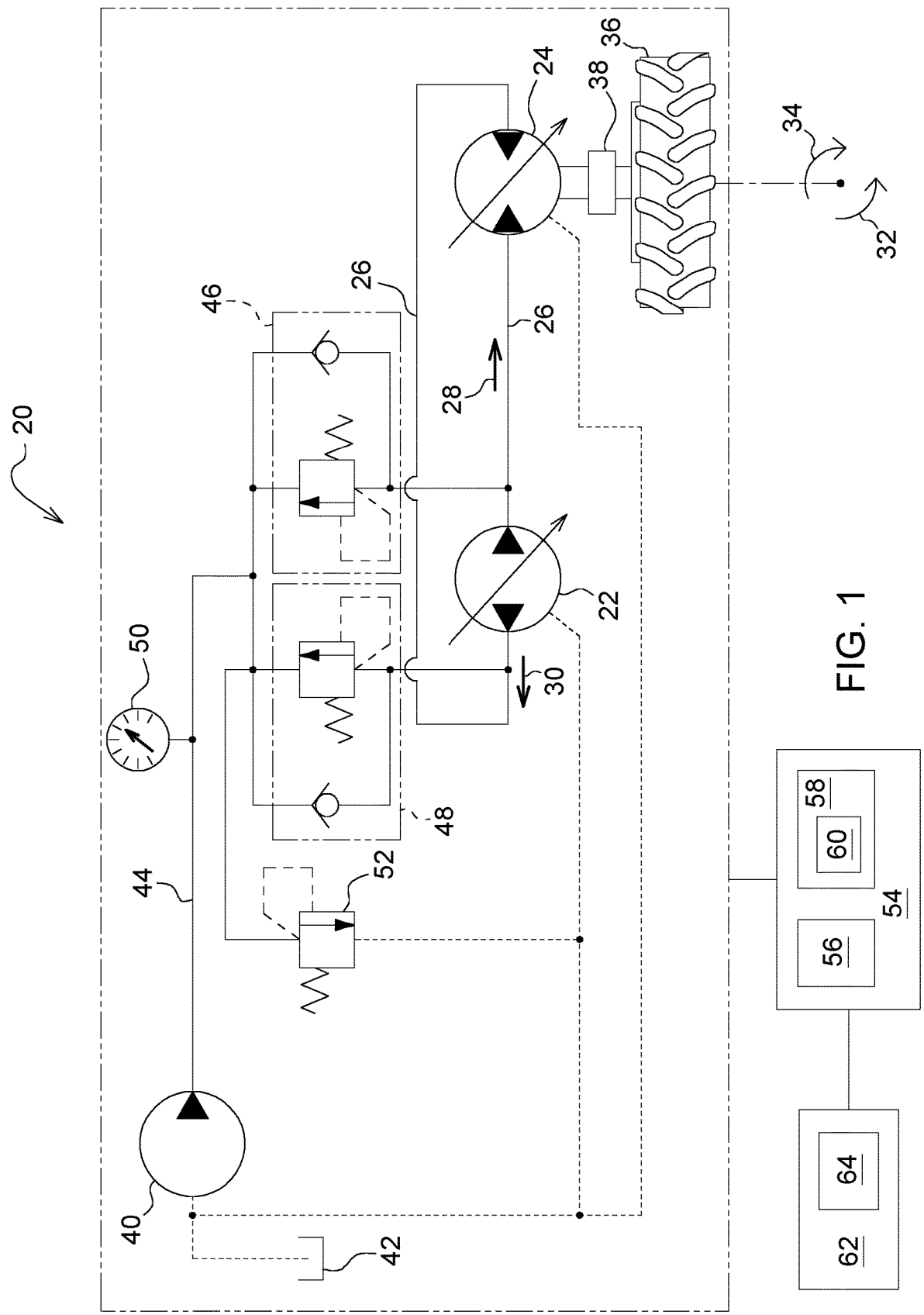
FIG. 1 is a schematic diagram of a hydrostatic transmission system.

Referring to FIG. 1, the hydrostatic transmission system 20 includes a primary pump 22 and a hydraulic motor 24 fluidically connected to each other via a closed hydraulic fluid circuit 26. The primary pump 22 is operable to pressurize and circulate a fluid through the closed hydraulic fluid circuit 26 to the hydraulic motor 24. The primary pump 22 pressurizes the fluid to an operating pressure. In one implementation, the primary pump 22 is a variable pump that may be controlled to pressurize the fluid to a plurality of different pressures. More particularly, in one implementation, the primary pump 22 is a bi-directional variable pump that is operable to circulate the fluid through the closed hydraulic fluid circuit 26 in either a first direction 28 or an opposite second direction 30. As such, it should be appreciated that the primary pump 22 may be controlled to circulate the fluid in either the first direction 28 to cause rotational output from the hydraulic motor 24 in a first rotational direction 32, or the primary pump 22 may be controlled to circulate the fluid in the second direction 30 to cause rotational output from the hydraulic motor 24 in a second rotational direction 34. Additionally, the primary pump 22 may be controlled so that the operating pressure of the fluid varies to provide on a requested load, speed, etc.

In one example implementation, the primary pump 22 may include a bi-directional variable swashplate fluid pump. However, it should be appreciated that the primary pump 22 may differ from the example implementation described herein. The specific type, configuration, and operation of the primary pump 22 are not pertinent to the teachings of this disclosure, are understood by those skilled in the art, and are therefore not described in greater detail herein.

The hydraulic motor 24 receives the fluid from the primary pump 22 via the closed hydraulic fluid circuit 26. As is understood by those skilled in the art, the hydraulic motor 24 generates torque and/or produces a rotational output in response to the applied fluid pressure/flow from the primary pump 22. The rotational output may be coupled to a drive train and/or a drive wheel 36 to propel the vehicle as is known in the art. In one implementation, the hydraulic motor 24 includes a bi-directional variable hydraulic motor 24 that is operable to rotate in the first rotational direction 32 in response to receiving fluid in the first direction 28, and rotate in an opposing second rotational direction 34 in response to receiving fluid in the second direction 30. Additionally, the rotational speed of the hydraulic motor 24 is dependent upon the fluid pressure and/or flow rate received from the primary pump 22. As such, the hydraulic motor 24 is operable to generate a rotational output that is variable in rotational speed.

The hydraulic motor 24 may include a park brake 38. The park brake 38 may be selectively engaged to block or prevent rotational output of the hydraulic motor 24. The park brake 38 may be internal to the hydraulic motor 24. In other implementations, the park brake 38 may be external to the hydraulic motor 24 and positioned to engage some other component that in turn blocks or prevents rotation of the hydraulic motor 24. The specific type, configuration, operation, etc. of the hydraulic motor 24, including the park brake 38, are understood by those skilled in the art, are not pertinent to the teachings of this disclosure, and are therefore not described in greater detail herein.

The hydrostatic transmission system 20 further includes a charge pump 40 coupled to a tank 42. The tank 42 is configured to contain a supply of the fluid. The charge pump 40 draws fluid from the tank 42, pressurizes the fluid to a charge pressure, and circulates the fluid through an open charge fluid circuit 44 back to the tank 42. In one example implementation, the charge pump 40 includes a fixed displacement fluid pump. However, it should be appreciated that the charge pump 40 may vary from the example implementation described herein. The specific type, configuration, and operation of the charge pump 40 are understood by those skilled in the art, are not pertinent to the teachings of this disclosure, and are therefore not described in greater detail herein.

As noted above, the primary pump 22 and the hydraulic motor 24 are connected in the closed hydraulic fluid circuit 26. As used herein, the closed hydraulic fluid circuit 26 includes a closed loop system, in which the return from the hydraulic motor 24 is directly connected to the primary pump 22. In other words, the return from the hydraulic motor 24 is the supply to the primary pump 22. As such, the primary pump 22 does not directly draw fluid from the tank 42. While the closed hydraulic fluid circuit 26 is a closed loop system, it should be appreciated that some of the fluid circulating within the closed hydraulic fluid circuit 26 may be lost and/or diverted. For example, a portion of the fluid may be diverted for lubrication and/or cooling and returned to the tank 42. Alternatively, fluid may be lost from the closed hydraulic fluid circuit 26 through leaking connections and/or internal seal leaks in either the primary pump 22 and/or the hydraulic motor 24.

The open charge fluid circuit 44 is fluidically coupled to the closed hydraulic fluid circuit 26. As used herein, the open charge fluid circuit 44 includes an open loop system, in which the charge pump 40 draws the fluid from the tank 42, circulates the fluid through the open charge fluid circuit 44, with the excess fluid returning back to the tank 42.

In the example implementation shown in FIG. 1 and described herein, a first control valve 46 is fluidically coupled to a first-direction side of the closed hydraulic fluid circuit 26 and a second control valve 48 is fluidically coupled to a second-direction side of the closed hydraulic fluid circuit 26. As is understood by those skilled in the art, pressurized fluid from the charge pump 40 may be introduced into the closed hydraulic fluid circuit 26 via either the first control valve 46 and/or the second control valve 48 to replenish any of the fluid lost from the closed hydraulic fluid circuit 26. The first control valve 46 and the second control valve 48 may each include a combination of components, such as but not limited to, a check valve, a pressure relief valve, such as shown in FIG. 1. Additionally, the first control valve 46 and the second control valve 48 may each include other components that are not shown in FIG. 1, such as but not limited to a bypass circuit. It should be appreciated that the specific construction and components of the first control valve 46 and the second control valve 48 may differ from the example components schematically illustrated in FIG. 1.

A charge pressure sensor 50 is positioned to sense the charge pressure of the fluid from the charge pump 40. The charge pressure sensor 50 may be positioned, for example, in fluid communication with the open charge fluid circuit 44. The charge pressure sensor 50 is operable to sense data related to the fluid pressure of the fluid within the charge pressure fluid circuit. The charge pressure sensor 50 may include any suitable fluid pressure sensor capable of sensing the charge pressure of the fluid int eh open charge fluid circuit 44.

A pressure relieve valve may be positioned within the open charge fluid circuit 44. The pressure relive valve is operable to control or limit fluid pressure within the open charge fluid circuit 44. When fluid pressure is greater than a pre-defined value, the pressure relief valve 52 opens, allowing fluid communication between the charge pump 40 and the tank 42. When fluid pressure is less than the pre-defined value, the pressure relief valve 52 closes, blocking fluid communication between the charge pump 40 and the tank 42. The specific type, configuration, and operation of the pressure relief valve 52 are understood by those skilled in the art, not pertinent to the teachings of this disclosure, and are therefore not described in greater detail herein.

The hydrostatic transmission system 20 further includes a transmission controller 54. The transmission controller 54 is disposed in communication with at least the charge pressure sensor 50, the hydraulic motor 24, and the park brake 38. The transmission controller 54 is operable to receive data from the charge pressure sensor 50, as well as control the operation of the primary pump 22 and the park brake 38. While the transmission controller 54 is generally described herein as a singular device, it should be appreciated that the transmission controller 54 may include multiple devices linked together to share and/or communicate information therebetween. Furthermore, it should be appreciated that the transmission controller 54 may be located on the vehicle or located remotely from the vehicle.

The transmission controller 54 may alternatively be referred to as a computing device, a computer, a controller, a control unit, a control module, a module, etc. The transmission controller 54 includes a processor 56, a memory 58, and all software, hardware, algorithms, connections, sensors, etc., necessary to manage and control the operation of the hydrostatic transmission system 20. For example, the transmission controller 54 may be in communication with a temperature sensor for receiving data related to a temperature of the fluid in the closed hydraulic fluid circuit 26. As such, a method may be embodied as a program or algorithm operable on the transmission controller 54. It should be appreciated that the transmission controller 54 may include any device capable of analyzing data from various sensors, comparing data, making decisions, and executing the required tasks.

As used herein, "transmission controller 54" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the transmission controller 54 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The transmission controller 54 may be in communication with other components of the hydrostatic transmission system 20, such as hydraulic components, electrical components, and operator inputs within an operator station of the associated vehicle. The transmission controller 54 may be electrically connected to these other components by a wiring harness such that messages, commands, and electrical power may be transmitted between the transmission controller 54 and the other components. Although the transmission controller 54 is referenced in the singular, in alternative embodiments the configuration and functionality described herein can be split across multiple devices using techniques known to a person of ordinary skill in the art.

The transmission controller 54 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 58 may include any non-transitory/tangible medium which participates in providing data or computer-readable instructions. The memory 58 may be non-volatile or volatile. Non-volatile media may include, for example, optical or magnetic disks and other persistent memory. Example volatile media may include dynamic random access memory (DRAM), which may constitute a main memory. Other examples of embodiments for memory 58 include a floppy, flexible disk, or hard disk, magnetic tape or other magnetic medium, a CD-ROM, DVD, and/or any other optical medium, as well as other possible memory devices such as flash memory.

The transmission controller 54 includes the tangible, non-transitory memory 58 on which are recorded computer-executable instructions, including a transmission diagnostic algorithm 60. The processor 56 of the transmission controller 54 is configured for executing the transmission diagnostic algorithm 60. The transmission diagnostic algorithm 60 implements a method of evaluating the performance of the hydrostatic transmission system 20, described in detail below.

Figure 2:
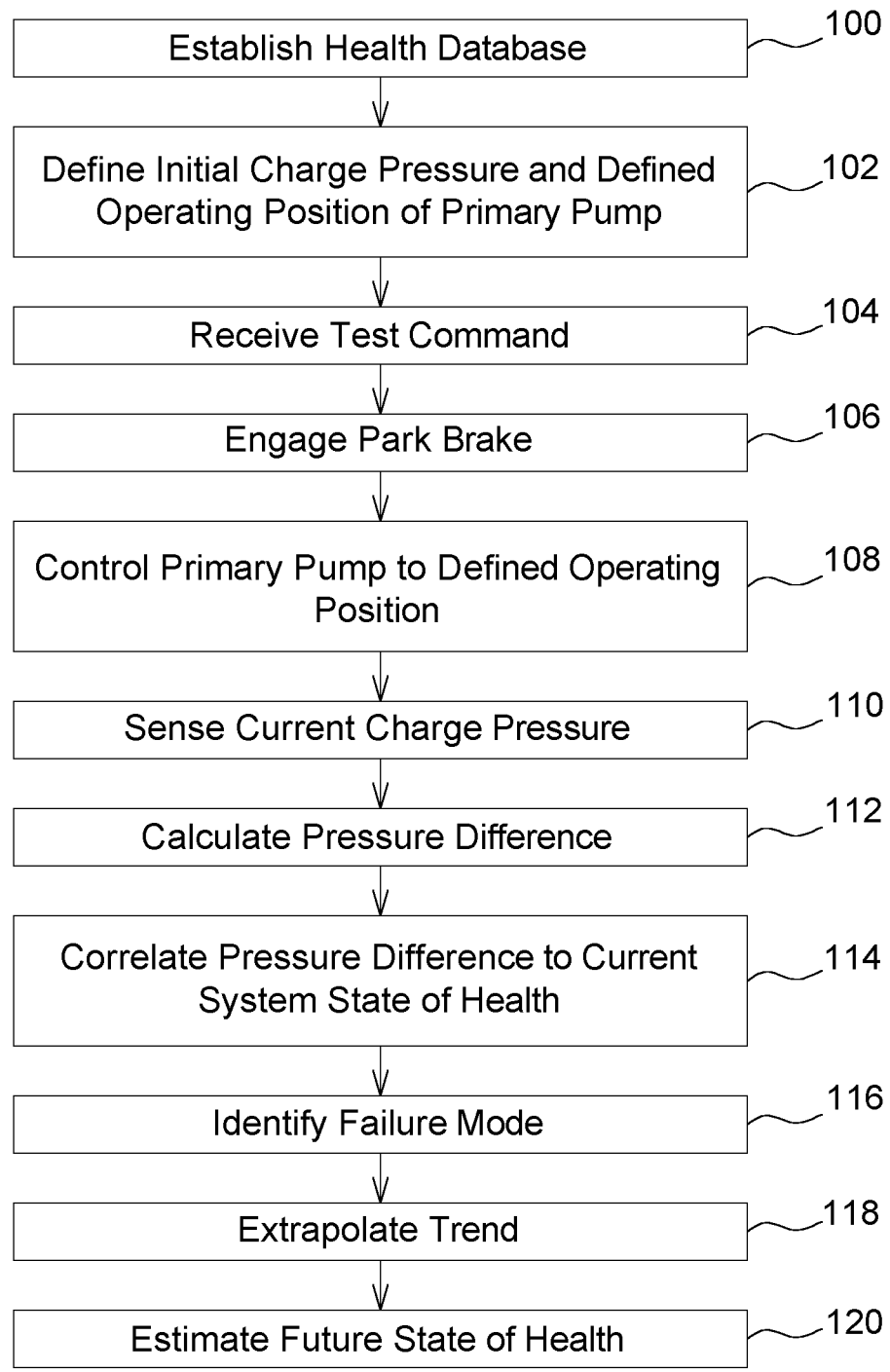
FIG. 2 is a flowchart representing a method of evaluating the performance of the hydrostatic transmission system.

The method described herein includes defining a health database for the hydrostatic transmission system 20. The health database may be saved on the memory 58. In one implementation, the health database is established and saved on the memory 58 at the time of manufacture of the vehicle. Referring to FIG. 2, the step of establishing the health database is generally indicated by box 100 shown in FIG. 2. The health database includes metrics, data, etc., relating to the proper or ideal functionality of the hydrostatic transmission system 20. For example, the health database may include an initial charge pressure of the charge pump 40 at a defined operating position of the primary pump 22. The defined operating position of the primary pump 22 may be defined to include, but is not limited to, a defined operating speed at various displacements, a defined position of one or more components of the primary pump 22, a defined pressure of the primary pump 22, etc. The initial charge pressure may be defined to include a value of what the proper charge pressure in the open charge fluid circuit 44 should be when the primary pump 22 and/or the hydraulic motor 24 are operating properly and at an ideal operating condition. The initial charge pressure may be determined at the time of manufacture, or may be an ideal design value.

In one implementation, the health database may include a respective value for a system state of health of the hydrostatic transmission system 20 for each of a plurality of ranges of variation from the initial charge pressure. The system state of health may be defined or otherwise include an indication of the performance level of the hydrostatic transmission system 20. The system state of health may be defined in terms of a percentage. For example, the system state of health when new or operating properly and at an ideal operating condition may be defined as 100%, whereas the system stat of health at complete failure may be defined as 0.0%. It should be appreciated that the system state of health may be defined in some other manner. For example, the system state of health may be defined on a number scale between 1 and 10, where 1 indicates a low or failing state of health and 10 indicates proper or ideal functionality. It should be appreciated that the system state of health may be defined in some other manner not described herein that is capable of expressing the current functionality of the hydrostatic transmission system 20 relative to proper or ideal functionality.

As noted above, the initial charge pressure defines the charge pressure in the open charge fluid circuit 44 when the primary pump 22 is commanded to the defined operating position. The defined operating position of the primary pump 22 may be defined to any operating position of the primary pump 22. In one implementation, the defined operating position of the primary pump 22 is defined to include a fully engaged position in which the primary pump 22 is commanded to output a maximum possible fluid pressure. However, in other implementations, the defined position of the primary pump 22 may be defined to include a defined percentage of the fully engaged position, e.g., 50% or 75%. The step of defining the initial charge pressure and the defined operation position of the primary pump 22 is generally indicated by box 102 shown in FIG. 2.

The process described below uses the variation of the charge pressure from the initial charge pressure as an indication of the system state of health. As such, the system state of health is related to the variation in the charge pressure from the initial charge pressure. For this reason, the health database may include a plurality of ranges of variation from the initial charge pressure. Each of the respective ranges of variation may be defined to have a respective value for the system state of health.

The health database may further include other data related to the performance of the hydrostatic transmission system 20, and more particularly related to the variation of the charge pressure from the initial charge pressure. For example, through prior testing, the health database may include one or more known failure modes of either the primary pump 22 and/or the hydraulic motor 24. Each respective failure mode may be associated with a respective and known variation. As such, a specific variation in the charge pressure from the initial charge pressure may be used as an indication of a specific known failure mode. The failure modes and their respective or value of the variation of the charge pressure from the initial charge pressure may be determined through testing. The know failure modes and their respective variations from the initial charge pressure may be saved or included in the health database.

While the process described herein is described as using the variation of the charge pressure from the initial charge pressure as the indication of the system state of health and/or to identify known failure modes, it should be appreciated that the variation in the charge pressure from the initial charge pressure may be converted or related to some other value, which is in turn used to indicate the system state of health and/or to identify known failure modes. For example, the variation in the charge pressure from the initial charge pressure may be used to calculate a leakage flow rate from the closed hydraulic fluid circuit 26. The leakage flow rate could then be used to indicate the system state of health and/or identify known failure modes. It should be appreciated that properties other than the leakage flow rate may be calculated or determined from the variation in the charge pressure from the initial charge pressure and used to indicate the system state of health and/or identify known failure modes.

In order to evaluate the performance of the hydrostatic transmission system 20, a user may input a test command into the transmission controller 54. The user may use an input device 62 to enter the test command. The input device 62 may include, but is not limited to, a touch screen display 64, a keyboard, a mouse, a stylus, a microphone, etc. The input device 62 may include any device capable of enabling the user to enter a command into the transmission controller 54. The transmission controller 54 receives the test command from the input device 62. The step of receiving the test command is generally indicated by box 104 shown in FIG. 2. The test command is a request to execute a transmission test mode with the transmission controller 54. The transmission test mode implements or executes the process described in greater detail below. In other implementations, the transmission test mode may be implemented automatically, i.e., without receiving the test command from the user, such as during a during a start-up or other diagnostic procedure.

Once the transmission test mode has been implemented, the transmission controller 54 engages the park brake 38 to prevent rotational output of the hydraulic motor 24 and/or resulting movement of the vehicle. The step of engaging the park brake 38 is generally indicated by box 106 shown in FIG. 2. The manner in which the park brake is engaged is dependent upon the specific configuration operation of the park brake. The manner in which the park brake is engaged and/or disengaged is understood by those skilled in the art, is not pertinent to the teachings of this disclosure, and is therefore not described in greater detail herein.

After the park brake is engaged, the transmission controller 54 controls the primary pump 22 to operate at the defined operating position. The step of controlling the primary pump 22 to operate at the defined operating position is generally indicated by box 108 shown in FIG. 2. Notably, in order to ensure that the vehicle does not move during the test procedure, the park brake is engaged prior to controlling the primary pump 22 to operate at the defined operating position. As described above, the defined operating position may include any operating position of the primary pump 22. The primary pump 22 may be controlled in a suitable manner, including but not limited to controlling the primary pump 22 with an electrical signal, a hydraulic signal, a combination of electrical and hydraulic signals, etc. the manner in which the primary pump 22 is controlled to operate the defined operating position is understood by those skilled in the art, is not pertinent to the teachings of this disclosure, and is therefore not described in greater detail herein.

Once the primary pump 22 has been controlled to operate at the defined operating position, data related to a current charge pressure from the charge pump 40 may be sensed. The step of sensing the current charge pressure is generally indicated by box 110 shown in FIG. 2. The data related to the current charge pressure is sensed with the charge pressure sensor 50 and communicated to the transmission controller 54. The data from the charge pressure sensor 50 may include the actual fluid pressure, a signal indicative of the actual fluid pressure, or some other form of data from which the fluid pressure in the open charge fluid circuit 44 may be determined and/or calculated. The current charge pressure is the fluid pressure within the open charge fluid circuit 44, between the charge pump 40 and the closed hydraulic fluid circuit 26, at the time the current charge pressure is sensed.

The transmission controller 54 may then calculate a pressure difference. The step of calculating the pressure difference is generally indicated by box 112 shown in FIG. 2. The pressure difference is the numerical difference between the initial charge pressure of the charge pump 40, i.e., fluid pressure at new or optimal performance level, and the current charge pressure of the charge pump 40, i.e., fluid pressure at the current operating performance level.

As the primary pump 22 and/or the hydraulic motor 24 wear during normal usage, internal leaks and/or other malfunctions may develop the degrade the operating performance of the primary pump 22 and/or hydraulic motor 24. For example, internal seals in the hydraulic motor 24 may begin to leak over time in response to normal wear and usage, or leaks at fluid connections and/or hose connections may develop. These issues may result in the fluid leaking from the closed hydraulic fluid circuit 26. It should be appreciated that these losses, due to performance degradation and/or equipment malfunctions are above and beyond the fluid losses from the closed hydraulic fluid system associated with designed fluid flow rates associated with cooling and/or lubrication of the system components. As a result of the unintended fluid losses from the closed hydraulic fluid circuit 26 losses, e.g., due to performance degradation of the system components, the fluid from the open charge fluid circuit 44 is introduced into the closed hydraulic fluid circuit 26 to maintain a design fluid volume in the closed hydraulic fluid circuit 26. For this reason, the fluid flow rate of the fluid into the closed hydraulic fluid circuit 26 may be used as an indication of the performance of the hydrostatic transmission system 20. Compared to optimal performance or intended design levels, the greater the volume of the fluid from the open charge fluid circuit 44 that is supplied to the closed hydraulic fluid circuit 26 over time, i.e., the fluid flow rate, the lower the current charge pressure will be. As such, the decrease in the fluid pressure within the open charge fluid circuit 44, i.e., the change in fluid pressure from the initial charge pressure to the current charge pressure, is directly related to the amount of fluid flow or fluid flow rate into the closed hydraulic fluid circuit 26.

Because the pressure difference is directly related to the performance of the hydrostatic transmission system 20, the pressure difference may be correlated to a current system state of health of the hydrostatic transmission system 20. The step of correlating the pressure difference to the current system state of health is generally indicated by box 114 shown in FIG. 2. Correlating the pressure difference to the current system state of health may include estimating a current charge flow leakage rate from the pressure difference. The current charge flow leakage rate reflects and/or is related to the amount or volume of the fluid introduced into the closed hydraulic fluid circuit 26 above that during optimal performance. The charge flow leakage rate may be calculated from Equation 1 below.

$$Q = K_v \sqrt{\Delta P} \quad \quad 1)$$

Referring to Equation 1 above, Q is the charge flow leakage rate, $K_v$ is a flow coefficient, and $\Delta P$ is the pressure difference. The charge flow leakage rate may then be correlated to the system state of health. It should be appreciated that the charge flow leakage rate may alternatively be calculated by other equations understood by those skilled in the art.

The flow coefficient $K_v$ may related to the density of the fluid in the closed hydraulic fluid circuit and a leakage area of the closed hydraulic fluid circuit. In one implementation, the temperature of the fluid is sensed with a temperature sensor, and the temperature of the fluid may then be correlated to a corresponding density of the fluid associated with the sensed temperature. The density of the fluid may be determined, for example, via a lookup table relating density of the fluid to temperature of the fluid. By so doing the charge flow leakage rate may be corrected for changes in density of the fluid.

In another implementation, the pressure difference may directly be correlated to the system state of health of the hydrostatic transmission system 20. For example, as described above, the health database may be defined to include the plurality of ranges of variation form the initial charge pressure, with each respective range having a corresponding system state of health. Correlating the pressure difference to the system state of health may include determining which of the plurality of ranges of variation from the initial charge pressure the pressure difference is within to identify or determine the respective value for the system state of health.

In one implementation, as described above, the system state of health may include an estimated life cycle usage and/or an estimated remaining life based on a magnitude of the pressure difference. Once the pressure difference has been calculated, the magnitude of the pressure difference may be compared to multiple ranges of the pressure difference to identify a respective life cycle usage. In other words, the life cycle usage is proportional to the magnitude of the pressure difference.

In another implementation, as described above, the system state of health may include identification of a potential failure mode. The identification of the potential failure mode may be based on the magnitude of the pressure difference. The step of identifying a potential failure mode is generally indicated by box 116 shown in FIG. 2. Once the pressure difference has been calculated, the magnitude of the pressure difference may be compared to multiple ranges of the pressure difference to identify known failure modes that fall within each respective range of the pressure difference. In other words, known failure modes may be related to specific ranges of the pressure difference. As such, the magnitude of the pressure difference may be used to identify potential failure modes of the hydrostatic transmission system 20.

Once the system state of health has be determined, the transmission controller 54 may save the date, time and system state of health in the memory 58. Additionally, the transmission controller 54 may communicate a message indicating the system state of health. The message may be communicated to an operator of the vehicle, or to a remote location. For example, the message may be communicated to the operator via a display 64 or other device located on the vehicle. In addition to or as an alternative, the message may be communicated to a remote location, such as communicating the message through the internet to a centralized data processing center.

Once the pressure difference has been correlated to the system state of health, the transmission controller 54 may then determine if the pressure difference is outside an allowable pressure range, or if the pressure difference is within the allowable pressure range. The allowable pressure range may include a range of the pressure difference values within the open charge fluid circuit 44 that indicate acceptable levels of performance. As such, values of the pressure difference inside or within the allowable pressure range may be considered acceptable, indicating that no maintenance of the hydrostatic transmission system 20 is required, whereas values of the pressure difference outside the allowable pressure range may be considered unacceptable, indicating that maintenance is required.

If the transmission controller 54 determines that the current pressure difference is outside the allowable pressure range, then the transmission controller 54 may automatically communicate a message requesting maintenance for the hydrostatic transmission system 20. The message may be communicated to the operator of the vehicle, or to the remote location. For example, the message may be communicated to the operator via the display 64 or other device located on the vehicle. In addition to or as an alternative, the message may be communicated to the remote location, such as communicating the message through the internet to the centralized data processing center.

The process described above describes a single test procedure. However, it is contemplated that the above described test procedure may be performed at intervals and/or during a plurality of different operating conditions over a period of usage, and the data for each test occurrence may be saved in the memory 58 of the transmission controller 54. The different operating conditions during which the data is collected may include, but are not limited to, differing speeds of the primary pump 22, differing pressures of the primary pump 22, etc. As such, the current charge pressure may be sensed multiple times over the period of usage. Additionally, the current charge pressure may be sensed during different operating conditions or operational settings for each test occurrence. The pressure difference for each test occurrence may be calculated to provide a plurality of distinct results over the period of usage. The plurality of distinct results may be saved in the memory 58 of the transmission controller 54.

Referring also to FIG. 3, the system state of health is generally shown along a vertical axis, and time is generally shown along a horizontal axis. The transmission controller 54 may then extrapolate a trendline or trend 68 from the plurality of distinct results over the period of usage 66. The step of extrapolating the trend is generally indicated by box 118 shown in FIG. 2. This trend 68 may be extended through a future usage period 70 using known mathematical linearization models. The extended trend 68 may then be used to estimate a future state of health at the future usage period 70 based on the extended trend 68. The step of estimating the future state of the transmission system 20 is generally indicated by box 120 shown in FIG. 2. Accordingly, by executing the above described test procedure over multiple occasions during a period of usage 66, the transmission controller 54 may provide an estimated future state of health 72 at the future usage period 70. For example, the transmission controller 54 may determine a likely future usage period 70 or date at which the system state of health 72 of the hydrostatic transmission system 20 will require maintenance and/or fall below a minimal allowable operating performance levels.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of evaluating performance of a hydrostatic transmission system having a primary pump, a hydraulic motor, and a charge pump fluidically connected via a closed hydraulic fluid circuit, the method comprising:
   defining an initial charge pressure of the charge pump at a defined operating position of the primary pump;
   controlling the primary pump with a transmission controller to operate at the defined operating position;
   sensing a current charge pressure from the charge pump when the primary pump is operating at the defined operating position with a charge pressure sensor;
   calculating a pressure difference between the initial charge pressure of the charge pump and the current charge pressure of the charge pump with the transmission controller; and
   correlating the pressure difference to a system state of health of the hydrostatic transmission system with the transmission controller.

2. The method set forth in claim 1, wherein the system state of health includes an estimated life cycle usage based on a magnitude of the pressure difference.

3. The method set forth in claim 1, wherein the system state of health includes identification of a potential failure mode based on a magnitude of the pressure difference.

4. The method set forth in claim 1, wherein sensing the current charge pressure and calculating the pressure difference includes sensing the current charge pressure and calculating the pressure difference during a plurality of different operating conditions over a period of usage to provide a plurality of distinct results over the period of usage.

5. The method set forth in claim 4, further comprising saving the plurality of distinct results in a memory of the transmission controller.

6. The method set forth in claim 4, further comprising extrapolating a trend from the plurality of distinct results over the period of usage and extending the trend through a future usage period.

7. The method set forth in claim 6, further comprising estimating a future state of health at the future usage period based on the trend.

8. The method set forth in claim 1, further comprising receiving a test command via an input device to execute a transmission test mode with the transmission controller, wherein in response to receiving the test command, the transmission controller executes the transmission test mode to control the primary pump to operate at the defined operating position.

9. The method set forth in claim 8, further comprising engaging a park brake with the transmission controller prior to controlling the primary pump to operate at the defined operating position in response to receiving the test command.

10. The method set forth in claim 1, wherein correlating the pressure difference to the system state of health of the hydrostatic transmission system includes estimating a current charge flow leakage rate from the pressure difference.

11. The method set forth in claim 10, further comprising sensing a temperature of a fluid in the closed hydraulic fluid circuit with a temperature sensor.

12. The method set forth in claim 11, further comprising correlating the temperature of the fluid to a density of the fluid.

13. The method set forth in claim 12, further comprising adjusting the current charge flow leakage rate based on the density of the fluid.

14. The method set forth in claim 1, further comprising automatically communicating a message requesting maintenance for the hydrostatic transmission system when the pressure difference is outside an allowable pressure range.

15. The method set forth in claim 1, further comprising defining a health database that includes a respective value for the system state of health for each of a plurality of ranges of variation from the initial charge pressure.

16. The method set forth in claim 15, wherein correlating the pressure difference to the system state of health of the hydrostatic transmission system includes determining which of the plurality of ranges of variation from the initial charge pressure the pressure difference is within to identify the respective value for the system state of health.

17. A hydrostatic transmission system comprising:
a primary pump and a hydraulic motor fluidically connected via a closed hydraulic fluid circuit, wherein the primary pump is operable to pressurize and circulate a fluid through the closed hydraulic fluid circuit to the hydraulic motor at an operating pressure, and receive the fluid via the closed hydraulic fluid circuit from the hydraulic motor;
a tank configured to contain a supply of the fluid;
a charge pump fluidically connected to the tank and the closed hydraulic fluid circuit, wherein the charge pump is operable to pressurize the fluid to a charge pressure to replenish the fluid lost through leakage from the closed hydraulic fluid circuit;
a charge pressure sensor positioned to sense the charge pressure of the fluid from the charge pump;
a transmission controller including a processor and a memory having a transmission diagnostic algorithm stored therein, wherein the processor is operable to execute the transmission diagnostic algorithm to:
receive a test command via an input device requesting initiation of a transmission test mode;
control the primary pump to operate at a defined operating position;
sense a current charge pressure from the charge pump when the primary pump is operating at the defined operating position with the charge pressure sensor;
calculate a pressure difference between an initial charge pressure of the charge pump at the defined operating position of the primary pump and the current charge pressure of the charge pump; and
correlate the pressure difference to a system state of health of the hydrostatic transmission system.

18. The hydrostatic transmission system set forth in claim 17, wherein the processor is operable to execute the transmission diagnostic algorithm to engage a park brake prior to controlling the primary pump to operate at the defined operating position in response to receiving the test command.

19. The hydrostatic transmission system set forth in claim 17, wherein the processor is operable to execute the transmission diagnostic algorithm to include an estimated life cycle usage with the system state of health, based on a magnitude of the pressure difference.

20. The hydrostatic transmission system set forth in claim 17, wherein the processor is operable to execute the transmission diagnostic algorithm to include identification of a potential failure mode with the system state of health, based on a magnitude of the pressure difference.

21. The hydrostatic transmission system set forth in claim 17, wherein the processor is operable to execute the transmission diagnostic algorithm to sense the current charge pressure and calculate the pressure difference during a plurality of operating conditions over a period of usage to provide a plurality of distinct results over the period of usage.

22. The hydrostatic transmission system set forth in claim 21, wherein the processor is operable to execute the transmission diagnostic algorithm to:
save the plurality of distinct results in the memory of the transmission controller;
extrapolate a trend from the plurality of distinct results over the period of usage and extend the trend through a future usage period; and estimate a future system state of health at the future usage period based on the trend.

23. The hydrostatic transmission system set forth in claim 17, wherein the processor is operable to execute the transmission diagnostic algorithm to automatically communicate a message requesting maintenance for the hydrostatic transmission system when the pressure difference is outside an allowable pressure range.

* * * * *